(12) United States Patent  (10) Patent No.: US 8,226,265 B2
Czajkowski et al.  (45) Date of Patent: Jul. 24, 2012

(54) ROTATING LIGHT

(75) Inventors: Robert A. Czajkowski, Tinley Park, IL (US); Myron F. Pavlacka, Frankfort, IL (US); Jecek J. Jozwik, Mokena, IL (US); Charles P. Meyer, New Lenox, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 13/103,286

(22) Filed: May 9, 2011

(65) Prior Publication Data

US 2011/0211349 A1 Sep. 1, 2011

Related U.S. Application Data

(63) Continuation of application No. 12/341,666, filed on Dec. 22, 2008, now Pat. No. 7,963,683.

(51) Int. Cl.
    *F21V 7/00* (2006.01)
(52) U.S. Cl. .......... 362/247; 362/241; 362/284; 362/324
(58) Field of Classification Search .................. 362/277, 362/282, 283, 284, 297, 298, 317, 319, 322, 362/323, 324, 346, 348, 514, 516, 517, 518, 362/540, 542, 543, 544, 545
    See application file for complete search history.

(56) References Cited

U.S. PATENT DOCUMENTS

| 5,126,923 | A  | 6/1992  | Hall, II |
| 5,490,049 | A  | 2/1996  | Montalan et al. |
| 5,517,388 | A  | 5/1996  | Hutchisson |
| 5,642,933 | A  | 7/1997  | Hitora |
| 5,929,788 | A  | 7/1999  | Vukosic |
| 6,183,100 | B1 | 2/2001  | Suckow et al. |
| 6,234,646 | B1 | 5/2001  | Ito |
| 6,238,073 | B1 | 5/2001  | Ito et al. |
| 6,283,613 | B1 | 9/2001  | Schaffer |
| 6,318,886 | B1 | 11/2001 | Stopa et al. |
| 6,367,949 | B1 | 4/2002  | Pederson |
| 6,380,865 | B1 | 4/2002  | Pederson |
| 6,424,269 | B1 | 7/2002  | Pederson |
| 6,461,008 | B1 | 10/2002 | Pederson |
| 6,472,996 | B1 | 10/2002 | Pederson |
| 6,554,441 | B2 | 4/2003  | Rohlfing et al. |
| 6,637,923 | B2 | 10/2003 | Amano |
| 6,641,284 | B2 | 11/2003 | Stopa et al. |
| 6,679,618 | B1 | 1/2004  | Suckow et al. |
| 6,705,745 | B1 | 3/2004  | Pederson |
| 6,814,459 | B2 | 11/2004 | Pederson |
| 6,814,480 | B2 | 11/2004 | Amano |
| 6,930,615 | B2 | 8/2005  | Pederson |
| 6,946,969 | B2 | 9/2005  | Pederson |
| 6,989,743 | B2 | 1/2006  | Pederson |
| 7,163,324 | B2 | 1/2007  | Pederson |
| 7,236,105 | B2 | 6/2007  | Brenner et al. |
| 7,394,398 | B2 | 7/2008  | Pederson |
| 7,425,078 | B2 | 9/2008  | Wilkinson et al. |
| 7,561,036 | B2 | 7/2009  | Pederson |
| 7,578,600 | B2 | 8/2009  | Czajkowski |

(Continued)

*Primary Examiner* — Y My Quach Lee
(74) *Attorney, Agent, or Firm* — Merchant & Gould, P.C.

(57) ABSTRACT

The present disclosure provides a lighting device that includes an array of LEDs arranged on a circuit board with a reflector that rotates relative to the LEDs to reflect the light in various directions. The reflector according to the present disclosure includes a compact construction that allows for effective light reflection. A related lighting system and method is also provided.

16 Claims, 10 Drawing Sheets

U.S. PATENT DOCUMENTS

| | | | |
|---|---|---|---|
| 7,810,972 B2 * | 10/2010 | Popelek | 362/514 |
| 7,963,683 B2 * | 6/2011 | Czajkowski et al. | 362/284 |
| 2002/0036908 A1 | 3/2002 | Pederson | |
| 2002/0114161 A1 | 8/2002 | Barnett | |
| 2006/0209542 A1 | 9/2006 | Anderson et al. | |
| 2007/0263376 A1 | 11/2007 | Wilkinson et al. | |
| 2008/0074279 A1 | 3/2008 | Chiu et al. | |
| 2009/0067152 A1 | 3/2009 | Nobayashi et al. | |

* cited by examiner

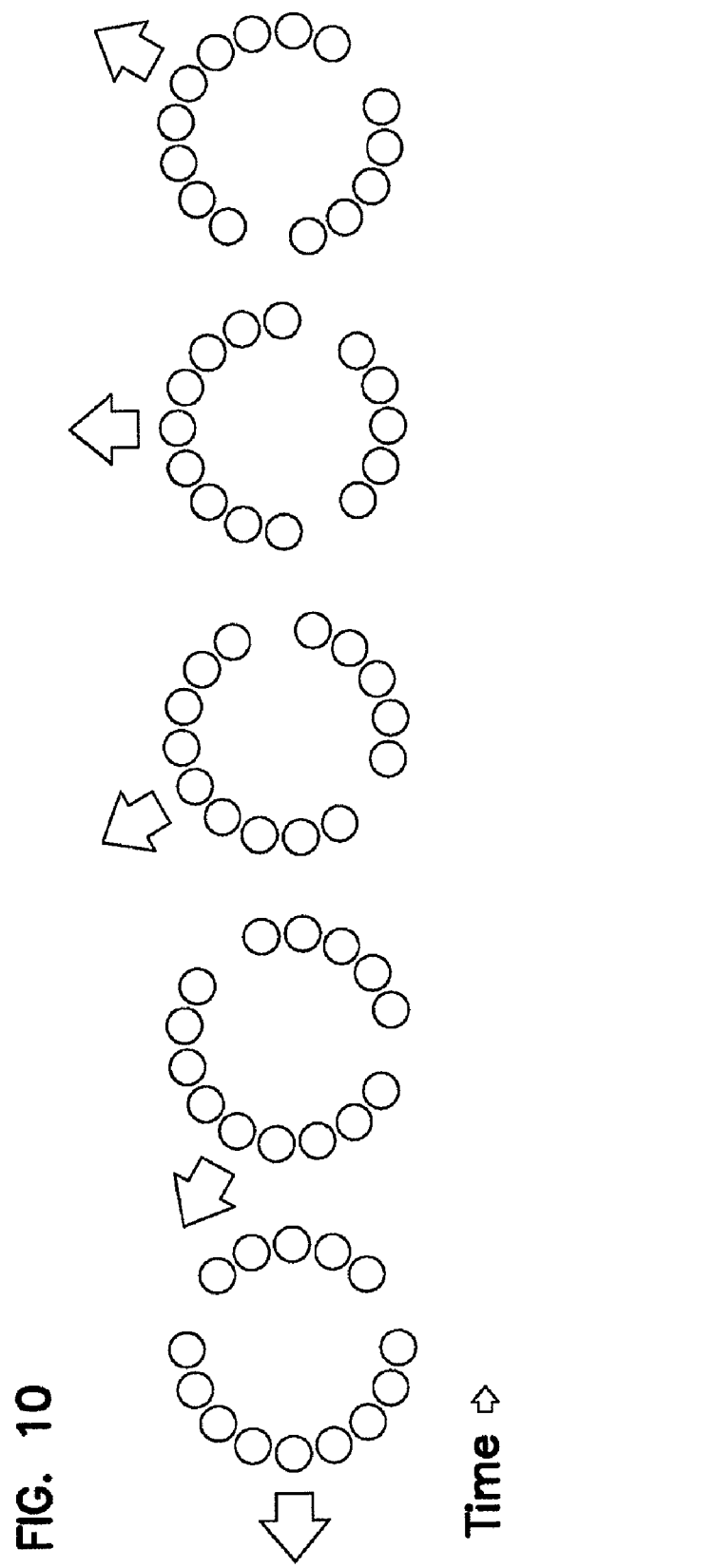

ROTATING LIGHT

CROSS REFERENCE TO RELATED APPLICATIONS

This application is a continuation of U.S. patent application Ser. No. 12/341,666 filed Dec. 22, 2008, the disclosure of which is incorporated herein by reference in its entirety.

TECHNICAL FIELD

The present disclosure provides a rotating lighting device wherein the light source includes light emitting diodes.

BACKGROUND

Rotating light sources are commonly used as warning lights. In some common applications the rotating lights are mounted to emergency response vehicles such as police vehicles and ambulances. In other common applications rotating lights are used mounted to the outside of aircraft or mounted to stationary objects such as radio towers.

Some rotating lights are configured such that the light source itself rotates, while others are configured so that the light source is stationary and mirror(s) are rotated to reflect the light in various directions. Traditionally, incandescent light sources are used in rotating lighting devices.

However, since light emitting diodes (LEDs) are long-lasting and efficient, attempts have been made to develop LED-based rotating lights. See, for example, US Pat. Publ. No. 2006/0209542 titled LED Based Rotating Beacon; US Pat. Publ. No. 2007/0263376 titled Rotating LED Beacon; and U.S. Pat. No. 6,461,008 titled LED Light Bar. Improved LED-based rotating lights are needed.

SUMMARY

The present disclosure provides a lighting device that includes an array of LEDs arranged on a circuit board with a reflector that rotates relative to the LEDs to reflect the light in various directions. The reflector according to the present disclosure includes a compact construction that allows for effective light reflection. A related lighting system and method is also provided.

BRIEF DESCRIPTION OF THE FIGURES

FIG. 10 is an illustration of the LED array function correlated to the position of the reflector.

DETAILED DESCRIPTION

Figure 1:
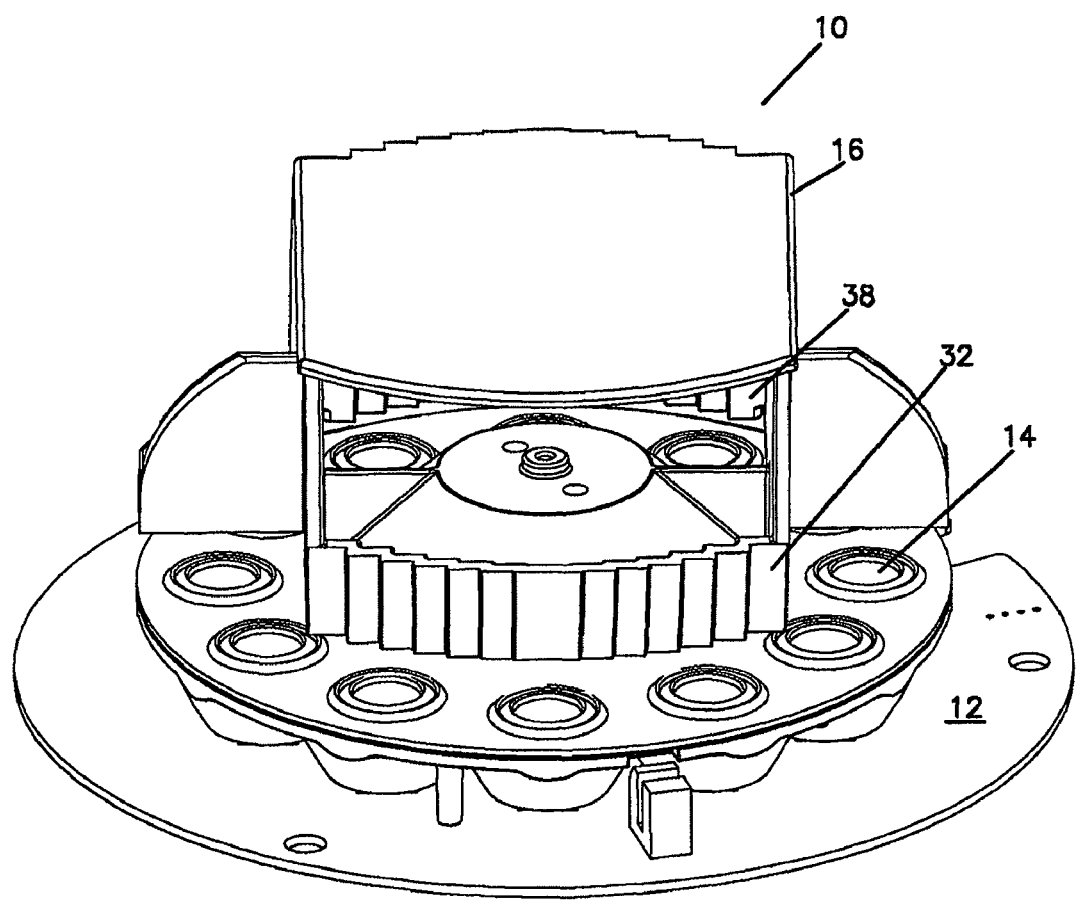
FIG. 1 is a perspective view of a rotating light according to an embodiment of the present disclosure.

Referring to FIG. 1, a rotating light 10 according to an embodiment of the present disclosure is shown. The rotating light 10 includes a circuit board 12 that supports an array of LEDs 14 and a reflector 16 that is configured to rotate relative to the LEDs 14.

Figure 2:
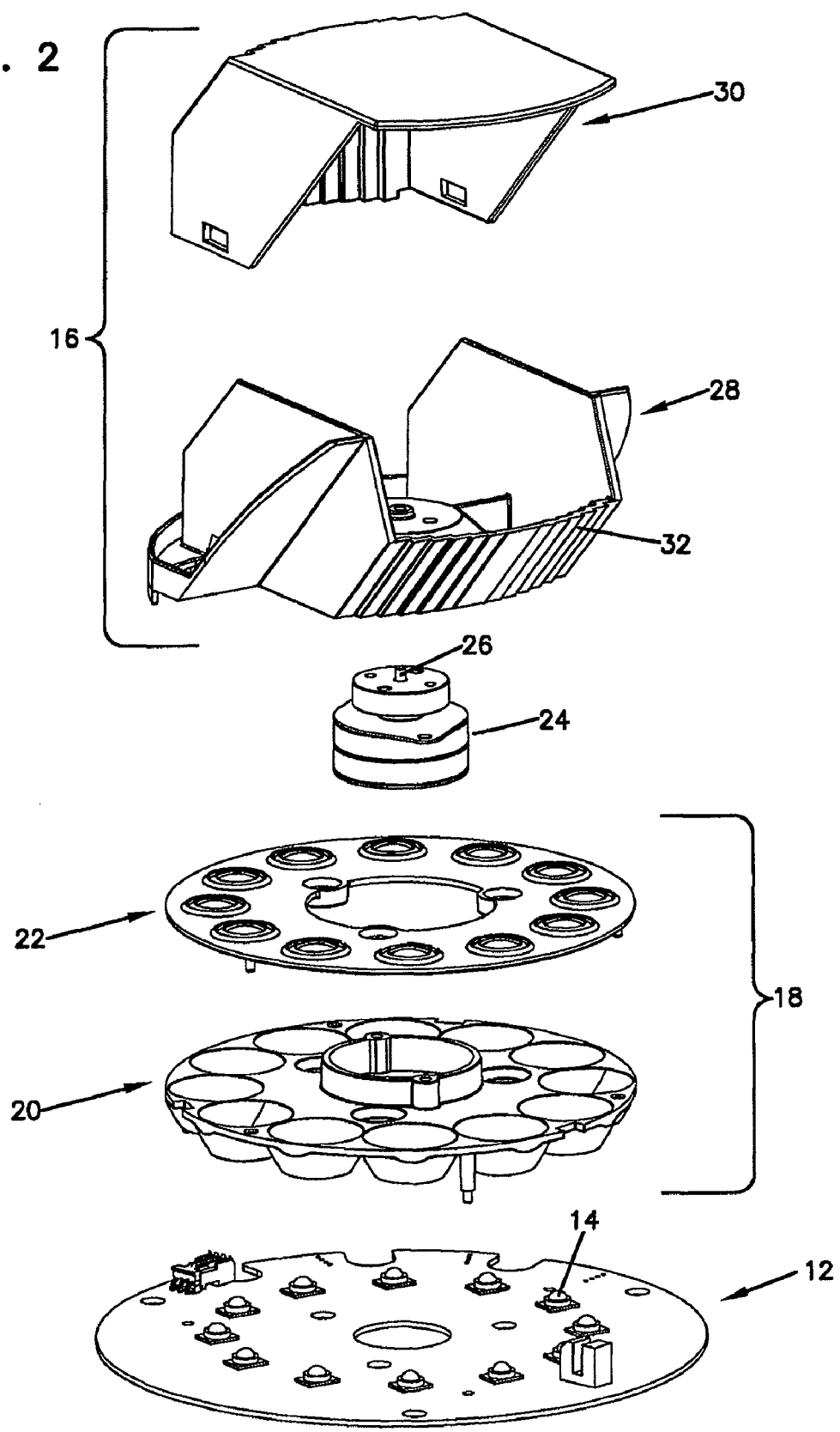
FIG. 2 is an exploded assembly view of the rotating light of FIG. 1.

Referring to FIG. 2, the components of the rotating light 10 are described in further detail. The circuit board 12 can be any type of circuit board that is capable of delivering power to the LEDs 14 that are connected thereto. In some embodiments the circuit board 12 includes a base that is made of metal or other material with sufficient heat transmission properties.

In the depicted embodiment a number of LEDs are spaced apart and arranged in a circle on the circuit board 12. Optical elements 18 are positioned between the LEDs 14 and the reflector 16. The optical elements 18 can be used to collimate the light emitted by the LEDs. In the depicted embodiment the optical elements 18 include a reflector cup ring 20 and a Fresnel lens ring 22. It should be appreciated in alternative embodiments that include optical elements 18, the optical elements 18 could take many different forms. For example, they could be parabolic reflectors, TIR lenses, or conventional lenses, or other optical elements.

In the depicted embodiment an electric motor 24 is shown mounted to the reflector cup ring 20 and extending through an aperture in the Fresnel lens ring 22. The electric motor includes a drive shaft 26 that drives the rotation of the reflector 16. In the depicted embodiment the drive shaft 26 defines the axis of rotation of the reflector 16, which is concentric about the circular array of LEDs 14. The depicted configuration in which the motor 24 is nestled between the reflector and the LEDs allows for a compact assembly. In some embodiments the motor 24 is wired to a remote power source, in other embodiments the motor is powered by a local rechargeable power source. It should be appreciated that the rotation of the reflector 16 could also be driven by a motor positioned at a different location (more remote from the reflector) via gears, belts, magnetic coupling, etc. Such a configuration may be used in a light bar type application where multiple reflectors and LED arrays are arranged in a single lighting unit.

Figure 3:
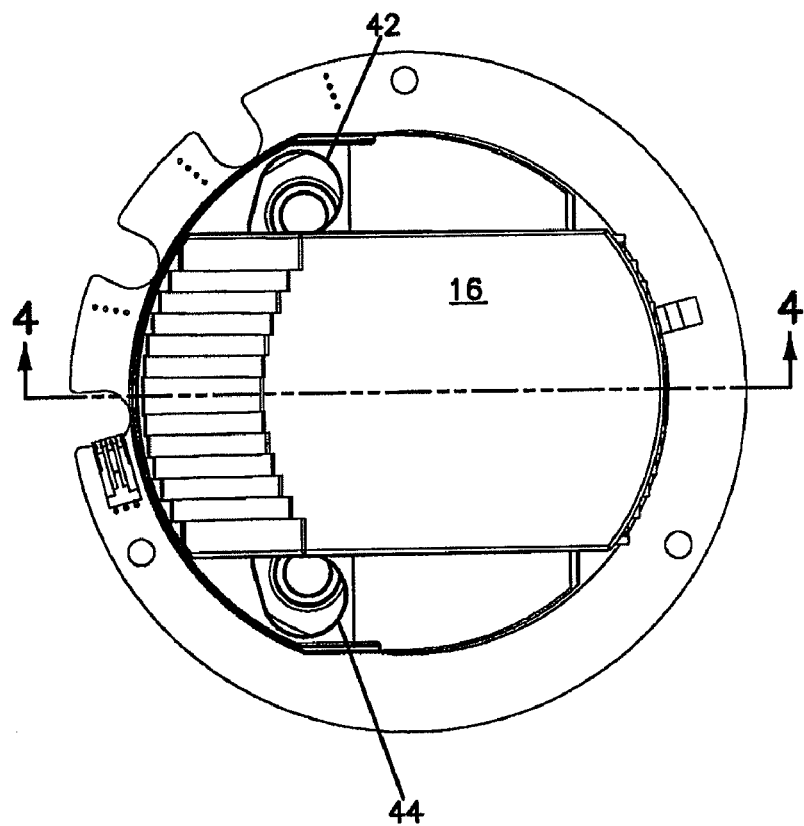
FIG. 3 is a top view of the rotating light of FIG. 1.
Figure 4:
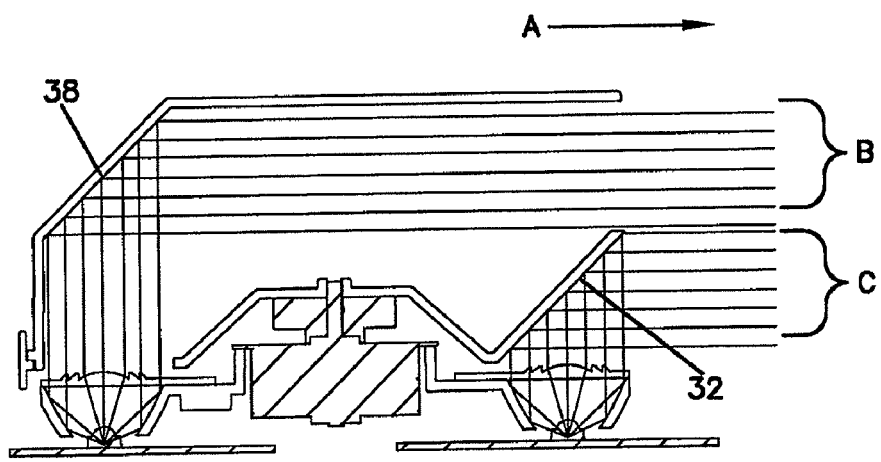
FIG. 4 is a cross-sectional view of the rotating light along line 4-4 of FIG. 3.

Referring to FIGS. 2-4, the reflector 16 is configured to rotate over the array of LEDs and cause the light emitted from the LEDs to rotate. In the depicted embodiment, as the reflector 16 rotates, different LEDs are aligned with the first and second reflective areas. In other words, at any point in time at least one LED is aligned with the first reflective area, but not aligned with the other reflective area.

In the depicted embodiment the reflector 16 includes a first member 28 with a first reflective area 32, and a second member 30 with a second reflective area 38. In the depicted embodiment the reflector 16 also includes apertures 42, 44 that allow light to emit through the reflector in the vertical direction (see FIG. 3). This feature enables the light to be easily located from a vantage point above the light (for example by a helicopter following a chase wherein the light is mounted to the roof of a police vehicle).

In the depicted embodiment the first reflective area 32 is positioned to receive light from a first group of LEDs, and the second reflective area 38 is positioned to receive light from a second group of LEDs. In the depicted embodiment the second reflective area 38 directly reflects the light in the same direction as the light reflected from the first reflective area 32. As discussed above, the array of LEDs is arranged in a circle. It should be appreciated that may other LED arrangements are also possible (e.g., multiple rings of LEDs arranged in a circle, LEDs arranged in rectangular arrays, etc.).

Figure 5:
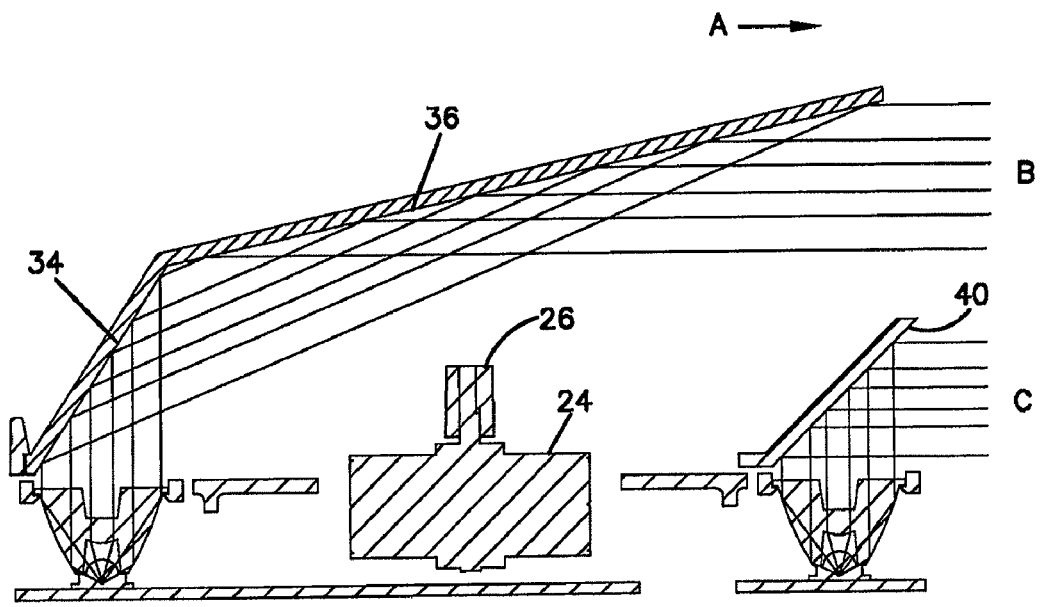
FIG. 5 is a cross-sectional view of an alternative embodiment of the rotating light of FIG. 4.

Referring to FIG. 5, an alternative embodiment is shown wherein In the depicted embodiment the reflector 16 includes a third reflective area 36 that is positioned to receive light reflected from the second reflective area 34 and reflect the light in generally the same direction as the light being reflected by the first reflective area 40.

In each of the above two depicted embodiments the light reflected from the first reflective area 32, 40 is reflected in a first direction "A" forming a first row "C" of reflected illumination, and the light reflected from the other reflective area (second and third reflective areas 34, 36 as in the embodiment shown in FIG. 5, or second reflective area 38 as in the embodiment shown in FIG. 6) is reflected in generally the same direction ("A") forming a second row "B" of reflected illumination that is adjacent the first row "C". In some embodiment the rows are spaced apart (see FIG. 5) and in other embodiment the rows are stacked one on top of the other (see FIG. 4). It should be appreciated that many other configurations are also possible.

Figure 6A:
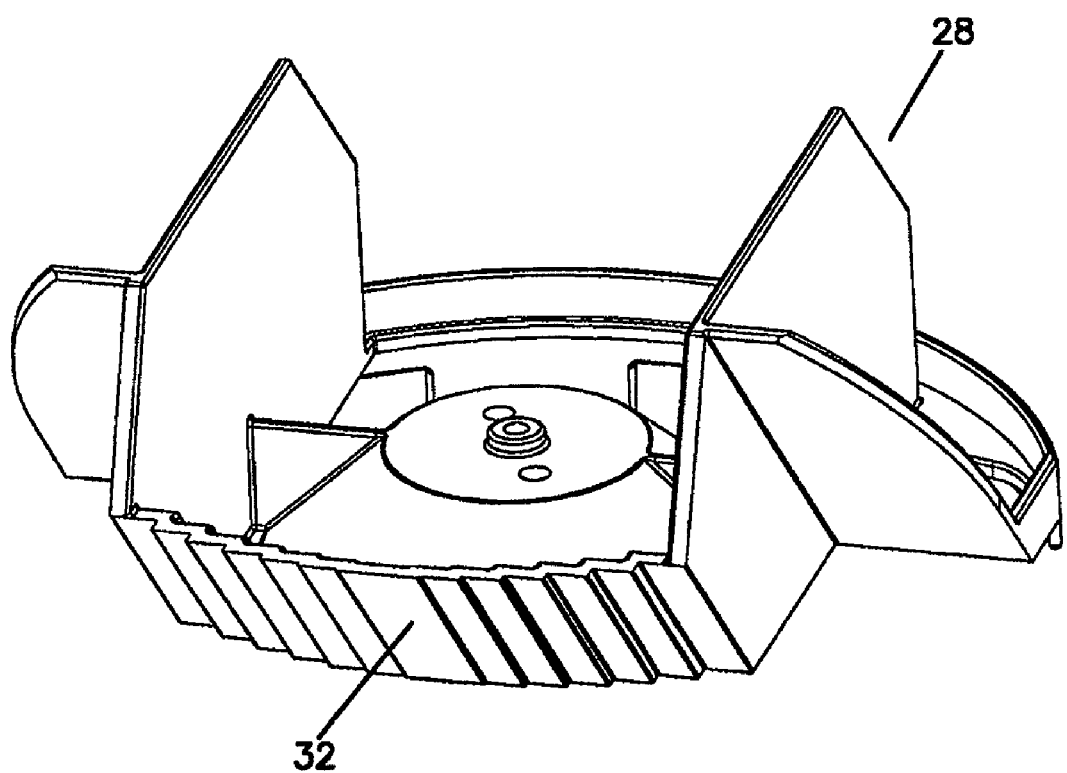
FIGS. 6a-b are perspective views of reflective areas of the rotating light of FIG. 1.
Figure 6B:
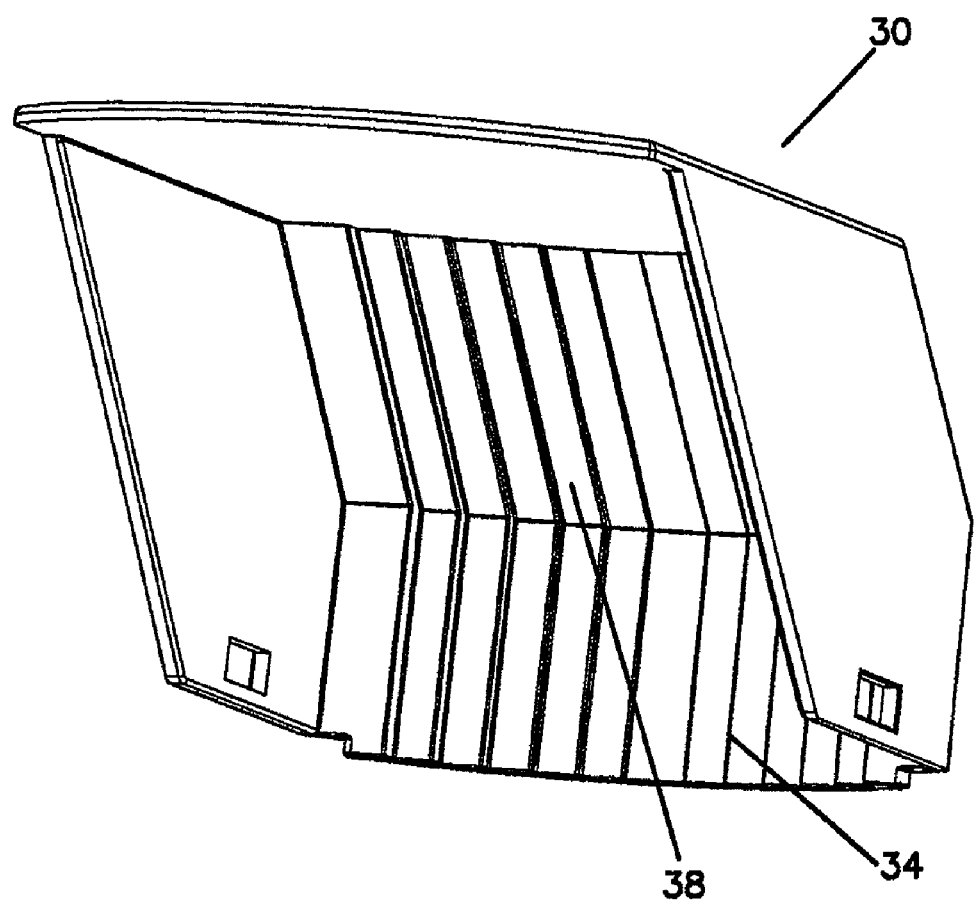

Referring to FIGS. 6a-b, the reflective areas of the reflector are shown in greater detail. In the depicted embodiments the at least one of the reflective areas has a curved edge profile. In the depicted embodiment the upper and/or lower edge profiles of reflective areas are correlated with the inner and outer diameter of the circular array of LEDs, respectively (i.e., the curve of the edge profile matches the curved arrangement of the LEDs). Moreover, in the depicted embodiments the first reflective area 32, 40 is convex and the other reflective area 34, 36, 38 is concave. In the depicted embodiments the first reflective area 32, 40 includes 10-20 facets, each oriented at about 45 degrees relative to the horizontal direction. The other reflective area 34, 36, 38 includes 10-20 facets which are also oriented at about 45 degrees relative to the horizontal direction.

Figure 7:
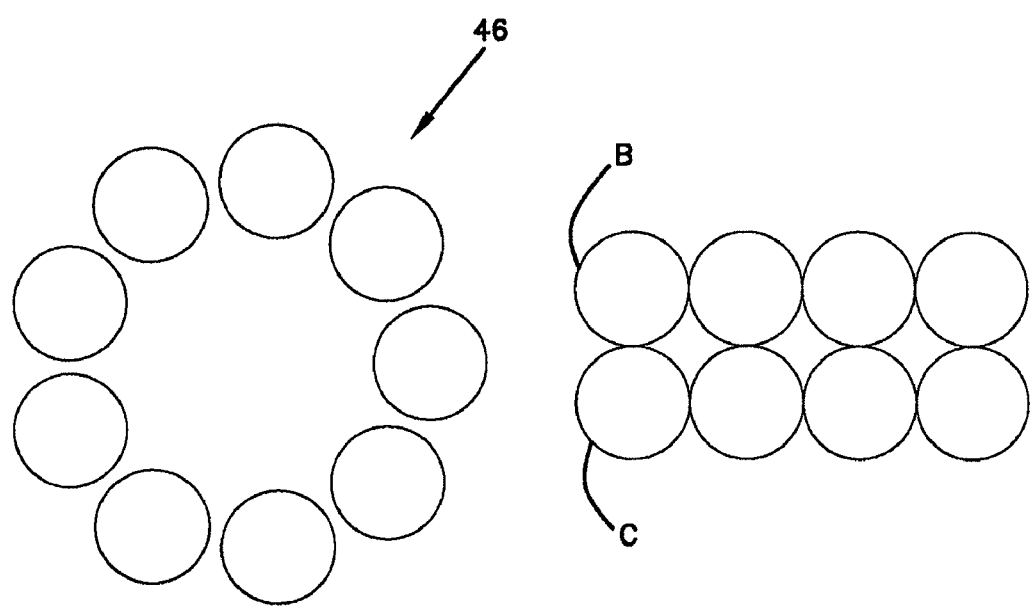
FIG. 7 illustrates the light concentration feature of the rotating light of FIG. 1.
Figure 8:
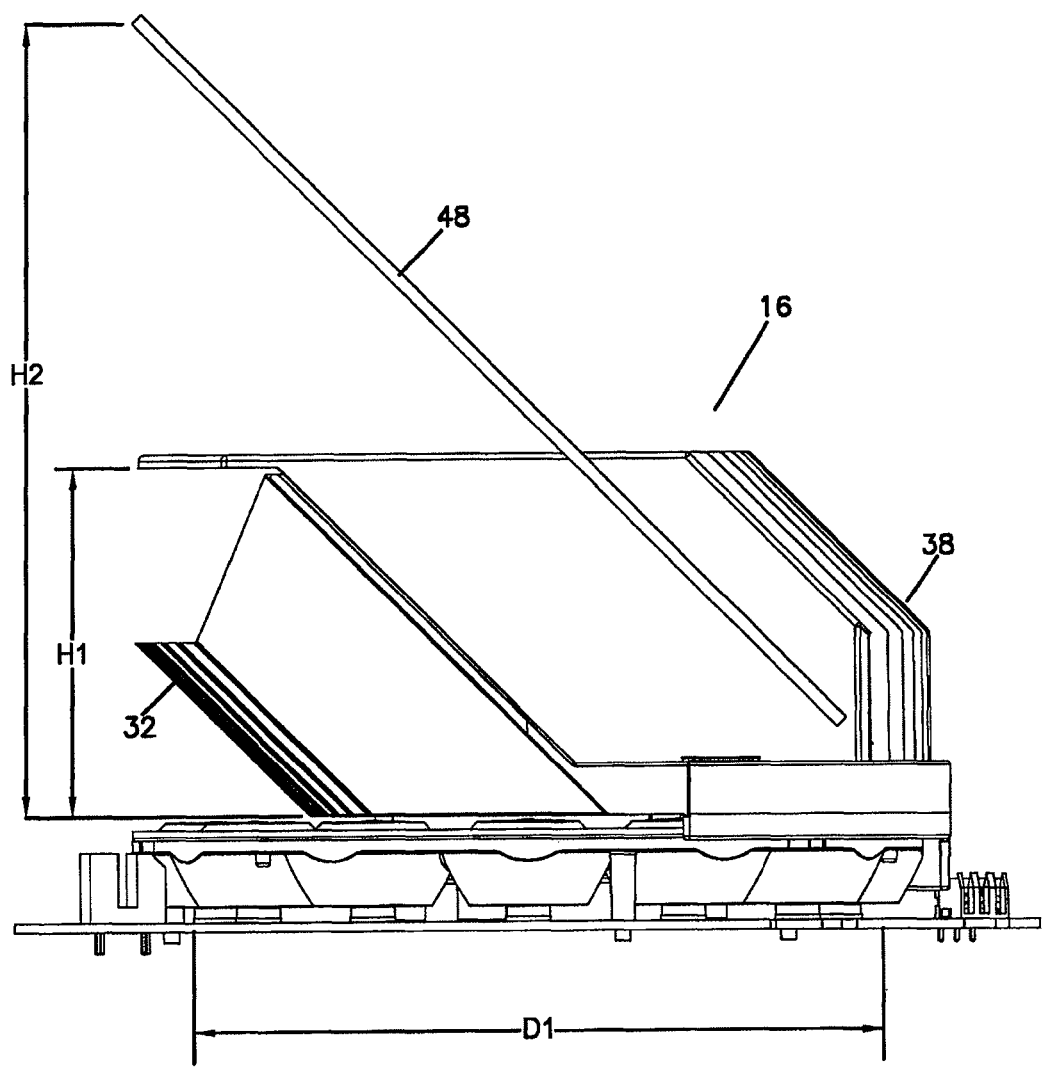
FIG. 8 is a view illustrating the low profile feature of the rotating light of FIG. 1.

Referring to FIGS. 7-8, a view directly into the reflected illumination is shown. The arrangement on the right depicts two adjacent rows of illumination "B", "C", which are the output from an embodiment of the reflector 16 of the present disclosure. The arrangement on the left illustrates the reflected illumination output from the standard reflector 48 (see FIG. 8). The output from the standard reflector 48 includes a ring of illumination 46 that surrounds a dark center area. The reflector 16 of the present disclosure is configured to provide a concentrated reflected light output. It should be appreciated that in alternative embodiments, the light output from the reflector can be more or less concentrated than what is shown in FIG. 7 (e.g., the reflected light output need not be in straight rows adjacent to each other).

Still referring to FIGS. 7-8, an embodiment of the light is shown fitted overlaid with a standard reflector 48 for comparison. In order to reflect light emitted from each of the LEDs in a horizontal direction, the standard reflector 48 must extend much higher than the reflector 16 of the present disclosure. For example, if the LEDs are arranged in a circular array with a diameter of D1 (e.g., 4.8 inches), the height of the reflector 48 would be about H2 (4.8 inches) to reflect the vertical light emitted from each LED in a generally horizontal direction. However, for the same configuration of LEDs the reflector 16 of the depicted embodiment would only be about H1 (2.1 inches) high to reflect the light emitted from the LEDs in a generally horizontal direction. In the depicted embodiment of the reflector 16, the height H1 of the reflector 16 is between ⅓ to ⅔ of the diameter D1 of the circular array of LEDs.

Figure 9:
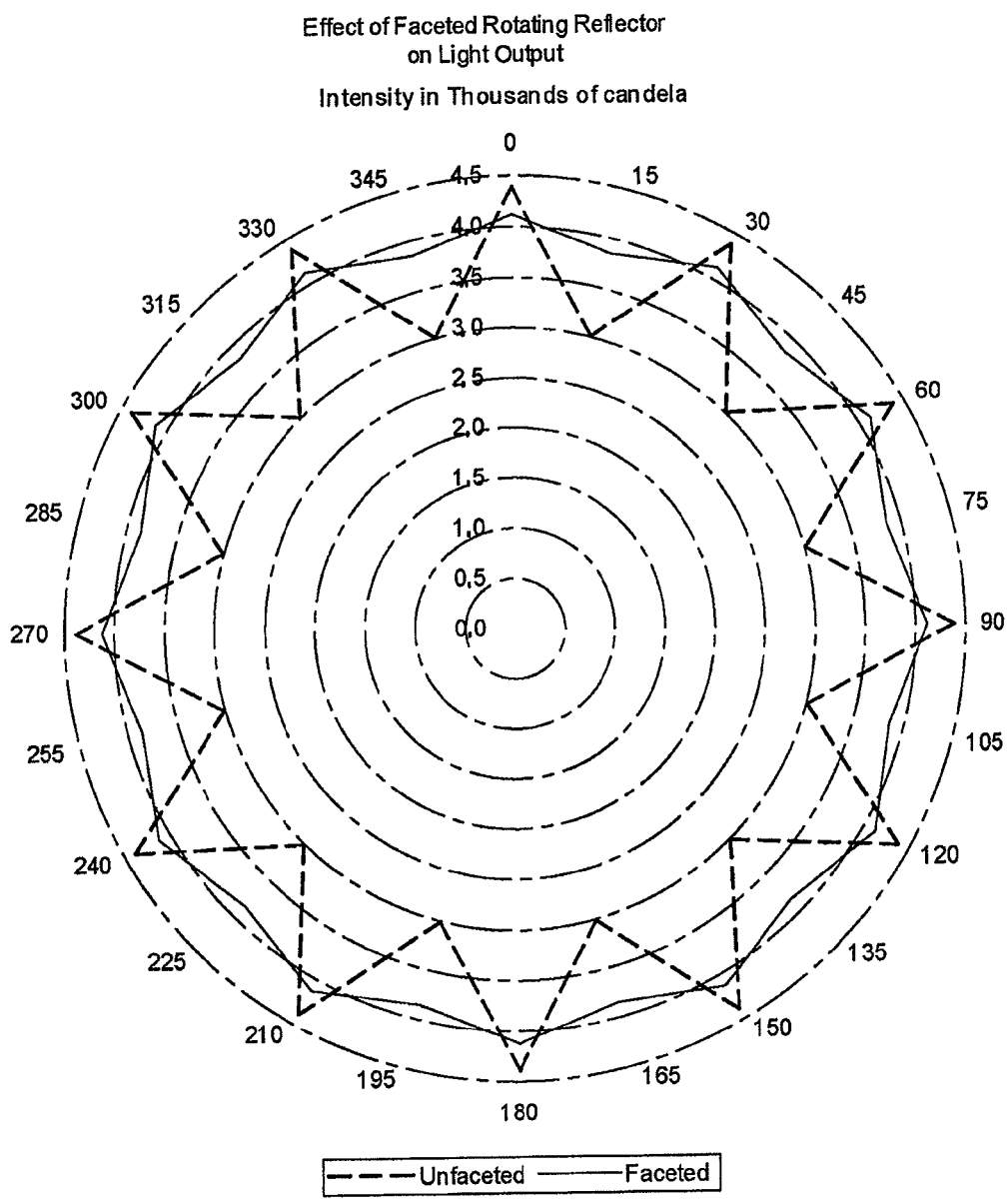
FIG. 9 is a graph illustrating the effect of the faceted reflecting areas of the rotating light of FIG. 1.

Referring to FIG. 9, a chart is shown that shows that the facets on the reflectors improve the uniformity of the illumination intensity as compared to unfaceted reflectors of otherwise the same configuration. The unfaceted mirror exhibits a peak-to-valley variation in the illumination intensity of 30 percent, while the variation exhibited by the facets of the depicted embodiment is about 7 percent.

Referring to FIG. 10, in the depicted embodiment at least one of the LEDs is not aligned with the reflective areas of the reflectors. The unaligned LED is selectively turned off momentarily to facilitate cooling. This cooling feature can be accomplished by employing a control unit that synchronizes the on and off function of the LEDs to the position of the reflector 16. Since the LED is turned off when it is out of alignment with the reflective areas, the brightness of the reflected light is not adversely affected. The arrows in FIG. 10 depict the direction of light propagation, which is correlated with the orientation of the reflector 16, over a particular time period. In the depicted embodiment two LEDs positioned at the sides of the reflector 16 are turned off at any one time for cooling purposes.

It should be appreciated that in other embodiments of the present disclosure, the LED is turned off momentarily for cooling even if it is aligned with one of the reflective areas, the affect on the brightness of the reflected light may be acceptable given the large number of LEDs that are illuminated at any one time. It should also be appreciated that in alternative embodiments, other means for cooling the LED may be used. For example, the reflector can be configured so that the rotation causes air flow, which cools the LEDs. The depicted configuration does force some airflow around the LED for added cooling. Many different mechanisms for selectively turning on and off the LEDs are possible.

In the depicted embodiment the rotation of the reflector 16 can be controlled so that the rotational speed can be changed. In some embodiments, the rotational speed is changed based on the velocity of the vehicle. For example, if the vehicle is moving faster, the reflector 16 may be slowed when the reflected light beam is generally facing in the direction of travel to provide more light in that direction. The rotation is controlled so that it spans a smaller angle range than the full 360 degrees. For example, the rotation can be set to sweep back and fourth through 180 degrees. The rotation of the reflector 16 can also be stopped at a particular orientation so that the light can be used as a spot light to provide constant light in one direction.

It should be appreciated that in some embodiments the array of LEDs 14 can be single color LEDs of the same color, in other embodiments the LEDs can be single color LEDs of different colors, and in yet other embodiments the LEDs can be multi-color LEDs (an individual LED that is configured to emit light of more than one color). In embodiments that include an array of LEDs of different colors or multiple color LEDs, the rotating light can be configured so that the light emitted can be changed based on the specific application of the rotating light. It should be appreciated that in the embodiments that include LEDs of different colors, the light emitted can be of a color that is different than the colors of the LEDs since activating two different colored LEDs can result in light having a third color (e.g., a combination of LEDs that are red, green, and blue can results in the rotating light being able to reproduce most colors). In other words, the selective activation of lights can enable the light emitted from the rotating light to be the color of some of the LEDs as well as colors that result from the mix of colors of the LEDs.

It should also be appreciated that alternative embodiments can include more reflectors so that the light emitted from the LEDs can be reflected in more than one direction simultaneously. For example, in some alternative embodiments the light can be reflected in two directions in the same plane (e.g., directions are 180 degrees relative to each other). In another alternative embodiment the light can be directed into different vertical planes (e.g., a first light beam could be emitted between 0-20 degrees from a horizontal plane and the second light beam could be emitted between 40-60 degrees from a horizontal plane). When such a rotating light is mounted to the top of a motor vehicle, the first light beam would direct light just over the top of similarly tall motor vehicles, whereas the second light beam would direct light higher into the sky and be visible from positions farther from the motor vehicle. In alternative embodiments, the orientation of the light beam can be changed during operation (e.g., the light beam can be adjusted to be directed an angle between 0-90 degrees from the horizontal plane). In such embodiments, the reflective surfaces can be configured so that their orientations relative to the reflector body can be changed during operation. For example, the reflective surface can be comprised of a plurality of small mirrors that can be reoriented by electrically controlling micro electrical mechanical switches.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A lighting device comprising:
    a circuit board;
    a plurality of LEDs arranged on the circuit board;
    a reflector including a first reflective area and a second reflective area, wherein the first and second reflective areas of the reflector are configured to rotate relative to the LEDs about a common axis, wherein the first and second reflective areas are arranged to reflect light from a different LED on the circuit board as the reflector rotates, and wherein a maximum height dimension of the reflector is between one-third to two-thirds of the maximum distance between a pair of LEDs of the plurality of LEDs,
    wherein the reflector further comprises a third reflective area that is configured to reflect light from at least the second reflective area in a direction that is generally the same direction as the light reflected by the first reflective area.

2. The lighting device of claim 1, wherein the reflector is configured so that the first and second reflective areas reflect light in the same general direction.

3. The lighting device of claim 1, wherein the first reflective area is configured such that the reflected light is arranged in a first row, wherein the second reflective area is configured such that the reflected light is arranged in a second row which is adjacent to the first row.

4. The lighting device of claim 1, further comprising optical elements positioned between the LEDs and the reflector.

5. The lighting device of claim 4, wherein the optical elements include lenses.

6. The lighting device of claim 1, wherein at least one of the first or second reflective areas is faceted.

7. The lighting device of claim 1, wherein at least one of the reflective areas has a curved edge profile.

8. The lighting device of claim 7, wherein at least one of the first or second reflective areas includes a portion that is generally concave, and at least one of the first or second reflective areas includes a portion that is generally convex.

9. The lighting device of claim 1, further comprising an electric motor positioned between the circuit board and the reflector, wherein the motor is configured to drive the rotation of the reflector relative to the LEDs.

10. The lighting device of claim 1, wherein the at least some of the plurality of LEDs are spaced apart and arranged in a circle.

11. The lighting device of claim 10, wherein the reflector is arranged relative to the LEDs such that an axis of rotation of the reflector is positioned in a center portion of the circle.

12. The light device of claim 10, wherein both of the first and second reflective areas have a curved edge profile that is correlated to the inner and outer radiuses of the circle of LEDs.

13. The lighting device of claim 1, wherein at least some of the plurality of LEDs arranged on the circuit board include multi-color LED lamp assemblies that include LED chips configured to emit light of different colors.

14. The lighting device of claim 1, wherein at least some of the plurality of LEDs arranged on the circuit board are arranged in a circle about the common axis.

15. A lighting device comprising:
    a circuit board;
    a plurality of LEDs arranged on the circuit board;
    a reflector including a first reflective area and a second reflective area, wherein the first and second reflective areas of the reflector are configured to rotate relative to the LEDs about a common axis, wherein the first and second reflective areas are arranged to reflect light from a different LED on the circuit board as the reflector rotates, and wherein a maximum height dimension of the reflector is between one-third to two-thirds of the maximum distance between a pair of LEDs of the plurality of LEDs,
    wherein at least one of the reflective areas has a curved edge profile,
    wherein at least one of the first or second reflective areas includes a portion that is generally concave, and at least one of the first or second reflective areas includes a portion that is generally convex.

16. A lighting device comprising:
    a circuit board;
    a plurality of LEDs arranged on the circuit board;
    a reflector including a first reflective area and a second reflective area, wherein the first and second reflective areas of the reflector are configured to rotate relative to the LEDs about a common axis, wherein the first and second reflective areas are arranged to reflect light from a different LED on the circuit board as the reflector rotates, and wherein a maximum height dimension of the reflector is between one-third to two-thirds of the maximum distance between a pair of LEDs of the plurality of LEDs;
    further comprising an electric motor positioned between the circuit board and the reflector, wherein the motor is configured to drive the rotation of the reflector relative to the LEDs.

* * * * *

UNITED STATES PATENT AND TRADEMARK OFFICE
CERTIFICATE OF CORRECTION

PATENT NO. : 8,226,265 B2
APPLICATION NO. : 13/103286
DATED : July 24, 2012
INVENTOR(S) : Czajkowski et al.

It is certified that error appears in the above-identified patent and that said Letters Patent is hereby corrected as shown below:

Title page, (75) Inventors: "Jecek J. Jozwik," should read --Jacek J. Jozwik,--

Signed and Sealed this
Eighth Day of January, 2013

David J. Kappos
*Director of the United States Patent and Trademark Office*